(12) United States Patent
Schroeck et al.

(10) Patent No.: US 7,847,515 B2
(45) Date of Patent: Dec. 7, 2010

(54) DEVICE FOR CHARGING BATTERIES

(75) Inventors: Rainer Schroeck, Lamprechtshausen (AT); Christian Stuerzer, St. Georgen (AT)

(73) Assignee: W&H Dentalwerk Bürmoos GmbH, Bürmoos (AT)

( * ) Notice: Subject to any disclaimer, the term of this patent is extended or adjusted under 35 U.S.C. 154(b) by 626 days.

(21) Appl. No.: 11/904,849

(22) Filed: Sep. 28, 2007

(65) Prior Publication Data

US 2008/0079391 A1    Apr. 3, 2008

(30) Foreign Application Priority Data

Sep. 29, 2006   (EP)   .................. 06020497

(51) Int. Cl.
*H02J 7/00* (2006.01)
(52) U.S. Cl. ...................... 320/106; 320/107
(58) Field of Classification Search .................. 320/106
See application file for complete search history.

(56) References Cited

U.S. PATENT DOCUMENTS

| | | | |
|---|---|---|---|
| 4,940,966 A | | 7/1990 | Pettigrew et al. |
| 5,111,128 A | | 5/1992 | Branan, Jr. et al. |
| 5,164,652 A | * | 11/1992 | Johnson et al. ............. 320/106 |
| 5,187,422 A | | 2/1993 | Izenbaard et al. |
| 5,438,248 A | * | 8/1995 | Hyuck ......................... 320/106 |
| 5,565,756 A | * | 10/1996 | Urbish et al. ................ 320/103 |
| 5,734,254 A | * | 3/1998 | Stephens ..................... 320/106 |
| 5,912,544 A | | 6/1999 | Miyakawa et al. |
| 5,963,014 A | | 10/1999 | Chen |
| 6,236,186 B1 | * | 5/2001 | Helton et al. ................ 320/106 |
| 6,323,547 B1 | * | 11/2001 | Kawamura et al. .......... 257/688 |
| 2005/0248310 A1 | * | 11/2005 | Fagan et al. ................. 320/106 |
| 2006/0232262 A1 | * | 10/2006 | Tanizawa et al. ........ 324/117 H |

FOREIGN PATENT DOCUMENTS

WO    WO 99/38238    7/1999

OTHER PUBLICATIONS

European Patent Office Search Report No. EP06020497 dated Mar. 13, 2007.

* cited by examiner

*Primary Examiner*—Edward Tso
*Assistant Examiner*—M'Baye Diao
(74) *Attorney, Agent, or Firm*—Klarquist Sparkman, LLP (57) ABSTRACT

In a second preferred variant of the second exemplary embodiment, the magnetic sensor detects the presence of a magnetic field of the magnetic element as long as no battery is connected to the charger. The battery comprises a shielding device which deflects or shields the magnetic field from the magnetic sensor, so that after connecting the battery to the charger, the magnetic sensor detects that no magnetic field is present and emits an identification signal. This variant is advantageous, in particular in stepped contact devices, whereby one of the two elements is a sensor or magnet at the bottom of the step and the other of the two elements is arranged on the leg at an angle thereto. This makes it possible to achieve a particularly good shielding effect. In this variant, several magnetic elements and magnetic sensors may also be provided.

22 Claims, 4 Drawing Sheets

DEVICE FOR CHARGING BATTERIES

CROSS REFERENCE TO RELATED APPLICATION

The present application claims priority from pending European Patent Application No. 06020497.1, filed Sep. 29, 2006, which is incorporated herein by reference.

BACKGROUND

1. Field

The present invention relates to devices for charging batteries and to batteries which can be charged with a charging device.

2. Description of Prior Art

Cordless medical handheld devices or handpieces having an internal power source in the form of batteries are becoming increasingly popular because of their ease of handling in comparison with handheld devices connected by a power cable to an external power source. Because of the different requirements, e.g., with respect to the power, design type or size of such cordless handheld devices, there is also a constantly proliferating number of batteries or types of batteries having different storage capacities, power supply, design, charging requirements, etc. To avoid requiring a separate charger for each type of battery, the charger units are designed so that different batteries may be connected to them. This means that the terminal or contact device of the charger is designed so that batteries of different designs or sizes can be connected to the chargers and/or that a charging circuit is provided that adapts the charging requirements to the particular connected battery, i.e., supplying it with the required power supply voltage or amperage or selecting the suitable charging method.

If a charger can adapt the charging current or the charging method to the connected battery, then before the start of the charging operation, it is necessary to determine the type of battery by means of an identification device and to select the respective charging method and/or the proper charging current parameters. Various approaches are known in this regard from the state of the art, e.g., mechanical switches, contacts of different lengths on the batteries, e.g., as disclosed in U.S. Pat. No. 5,187,422, or resistance measurements, with each type of battery being provided with a recognition resistor. By determining the resistance value, it is possible to recognize the different types of batteries. All these identification devices have disadvantages, however; in particular due to the repeated use there may be changes in the mechanical components, so that invalid contact resistances occur in the resistance measurement, for example, and therefore the type of battery is not recognized at all or is identified incorrectly.

It would be advantageous to create a device for charging batteries of medical equipment using an alternative means of recognizing the batteries that is inexpensive, reliable, even after repeated uses, and easy to manufacture and to create a corresponding battery.

SUMMARY

With the inventive devices for charging batteries, hereinafter also referred to as chargers, the different types of batteries or accumulators are recognized by a proximity-type or contactless magnetic identification device. This advantageously eliminates the need for direct contact between the battery to be charged and the identification device and thus the risk of invalid identification due to impaired contacting.

The inventive device and the inventive battery are extremely resistant to soiling, have a good resistance to high temperatures, such as the temperatures needed for sterilization of the battery, for example, and are characterized by a simple circuit; furthermore, they generate only a low radiant emission with respect to limit values that must be maintained with regard to electromagnetic compatibility (EMC requirements).

In a first exemplary embodiment, the identification device comprises at least one magnetic sensor, which is arranged in or on the charger and is connected to the charging circuit. The at least one magnetic element is mounted in or on the battery, at least one magnetic parameter of said magnetic element being ascertained by the identification device.

In a second exemplary embodiment, the identification device has at least one magnetic element and at least one magnetic sensor for detection of at least one magnetic parameter of the at least one magnetic element, whereby the at least one magnetic sensor is connected to the charging circuit for relaying an identification signal; the at least one magnetic element and the at least one magnetic sensor are designed so that the at least one magnetic parameter of the at least one magnetic element is variable by a magnetic parameter varying device connected to a connectable battery, and this change is detectable by the at least one magnetic sensor. Two possible functions of the magnetic parameter varying device, and there are others, are shielding and/or amplifying. The advantage of this second exemplary embodiment is in particular the fact that the battery does not have a magnetic element. If a battery with a magnetic element is inserted into the handle, e.g., for driving the motor of the handheld device, there is the risk that the magnetic field of the magnetic element of the battery might influence components in the handheld device in an unwanted manner, in particular magnetic sensors present in the handheld device for control purposes. This risk is eliminated by the second exemplary embodiment.

In both exemplary embodiments, the charging circuit is designed for recognizing the different connectable batteries on the basis of the identification signal and for selecting the charging requirement(s) assigned to the different batteries as a function of the identification signal.

A charger according to the second exemplary embodiment may have one or more magnetic sensors of the same or different types, in particular a magnetic sensor designed to emit an identification signal in the presence of a magnetic field and/or a magnetic sensor designed to emit an identification signal as a function of the magnetic polarity detected and/or a magnetic sensor designed to emit an identification signal as a function of the magnetic field strength detected and/or a magnetic sensor designed to emit an identification signal as a function of the field direction detected. A charger according to the second exemplary embodiment may also have one or more magnetic elements. The magnetic sensors as well as the magnetic elements are arranged essentially in the area of the contact devices.

A rechargeable battery or accumulator that works with a charger according to the second exemplary embodiment must have at least one magnetic parameter varying device by means of which a magnetic parameter of the magnetic element of the charger is variable, in particular amplifiable, e.g., in the sense of bundling or concentrating the magnetic field lines, or attenuable or variable in direction in addition to having at least one battery cell that is capable of being repeatedly recharged electrically and having electric contacts that are connected to the at least one battery cell and can be connected to the charger. The magnetic parameter varying device may be formed by a magnetically conductive material, in particular by an element of soft iron and/or by a magnetic shielding material that deflects or shields the magnetic field so that it no longer reaches the magnetic sensor. The magnetic parameter varying device may be an independent component, e.g., a rod, a plate or a bar which is mounted in or on the battery or may be formed by the battery or a part of the battery, e.g., by its housing. Such battery parts may additionally be specially designed to achieve a better shielding and/or amplifying effect, e.g., designed with a greater wall thickness, preferably in a certain section in which the shielding effect is supposed to be good.

In a first preferred variant of the second exemplary embodiment, the charger has a magnetic sensor for measuring the magnetic field strength and a magnetic element whose magnetic field strength is selected so that the magnetic sensor does not detect the field strength, so the field strength is below the detection limit of the sensor, for example. If a battery having an amplifier device in the form of a soft iron element designed for the magnetic sensor and the magnetic element is placed on the charger, then the magnetic parameter varying device bundles or concentrates the magnetic field in the direction of the magnetic sensor so that it can detect the magnetic field and can emit an identification signal to the charge controller. Through suitable selection of the amplification device, different magnetic field strengths can be generated, so that several types of batteries can be recognized by just one magnetic sensor and one magnetic element. Of course, multiple magnetic elements and magnetic sensors may also be provided.

In a second preferred variant of the second exemplary embodiment, the magnetic sensor detects the presence of a magnetic field of the magnetic element as long as no battery is connected to the charger. The battery comprises a shielding device which deflects or shields the magnetic field from the magnetic sensor, so that after connecting the battery to the charger, the magnetic sensor detects that no magnetic field is present and emits an identification signal. This variant is advantageous, in particular in stepped contact devices, whereby one of the two elements is a sensor or magnet at the bottom of the step and the other of the two elements is arranged on the leg at an angle thereto. This makes it possible to achieve a particularly good shielding effect. In this variant, several magnetic elements and magnetic sensors may also be provided.

In one embodiment, the at least one magnetic parameter varying device comprises paramagnetic or preferably ferromagnetic material. This material concentrates or bundles the magnetic field lines, in particular in its surroundings, thus raising the magnetic field strength in the surroundings. To achieve this effect, preferably the magnetic conductivity of the at least one magnetic parameter varying device is higher then the magnetic conductivity of its surroundings. A magnetic sensor, which is in the vicinity of the magnetic parameter varying device, may detect the rising magnetic field strength and send a signal to identify the battery. The paramagnetic or ferromagnetic material may comprise, for example, platinum, lithium, sodium, potassium and iron, cobalt or nickel.

In one embodiment, the at least one magnetic parameter varying device comprises diamagnetic material. This material diverts the magnetic field lines, in particular in its surroundings, thus reducing the magnetic field strength in the surroundings. A magnetic sensor, which is in the vicinity of the magnetic parameter varying device, may detect the reduced magnetic field strength and send a signal to identify the battery. The diamagnetic material may comprise, for example, bismuth.

In another embodiment, the at least one magnetic parameter varying device is nonmagnetic, in other words it does not have a magnetic source, e.g. a permanent magnet. This embodiment has the advantage that the magnetic parameter varying device does not affect or interfere with elements of the battery or electronic parts of a device that the battery is intended to power, e.g. an electronic motor of a medical handpiece.

The concept of different charging requirements is understood to mean that specific settings, parameters or prerequisites are to be selected for recharging a certain type of battery, e.g., different batteries must be charged with different charging methods or they require different types of charging currents, in particular different voltages and/or amperages.

This invention will now be explained below on the basis of preferred exemplary embodiments with reference to the accompanying drawings:

DETAILED DESCRIPTION

Figure 1:
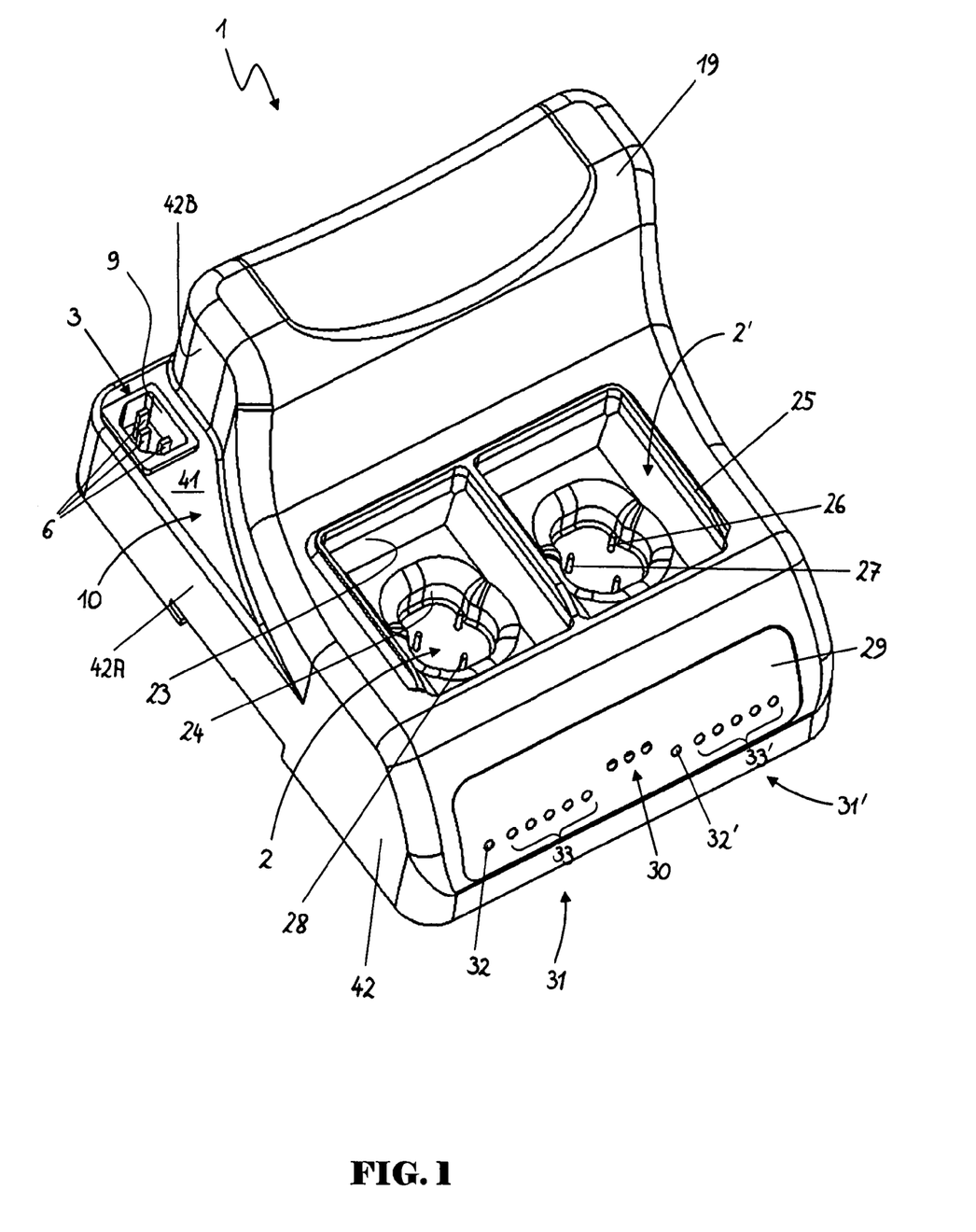
FIG. 1 shows a view of an exemplary embodiment of a device for charging batteries.

FIG. 1 shows a charger 1 having an outside housing 19 in which two electric contact devices 2, 2' are arranged. The number of contact devices 2, 2' is shown merely as an example, so the charger may of course also have only one or more than two contact devices. Each of the two contact devices 2, 2' comprises a first recess 23 and a second recess 24, each in the form of an offset, which may have different diameters and shapes. Due to these different shapes, batteries with different outside shapes may be connected to the charger 1 and charged there. Recess 23 has essentially a rectangular shape, while recess 24 has a rounded, essentially oval shape. Recess 24 is arranged in recess 23 so that the contact devices 2, 2' have a stepped design. A narrow web 25 surrounds three sides of each of the two contact devices 2, 2'.

Figure 5:
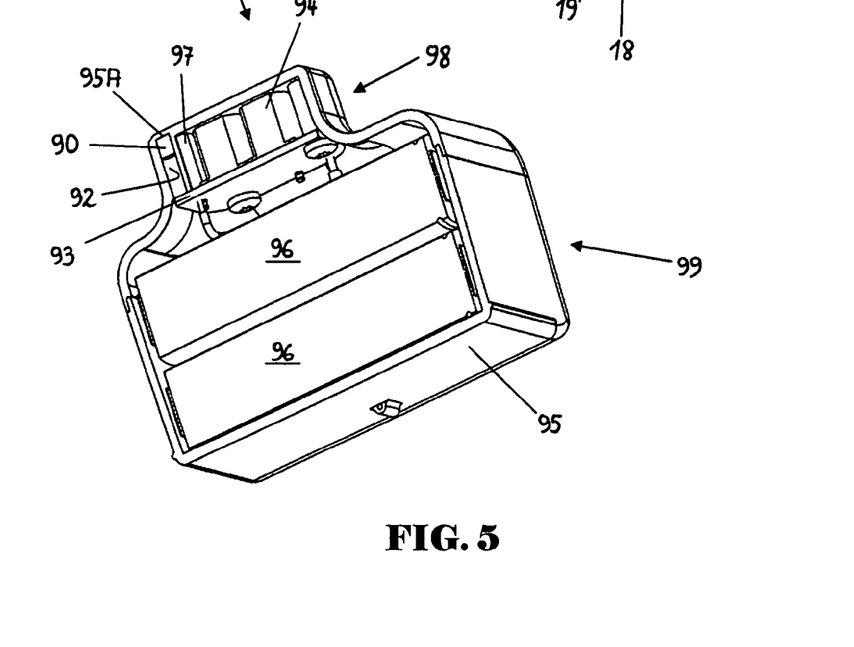
FIG. 5 shows a sectional diagram through a battery or an accumulator for use with a device for charging batteries.

FIG. 5 shows an example of a battery or an accumulator that can be charged with this charger 1. The battery 100 comprises a housing 95, which is preferably made of plastic and surrounds a body 99 that can be inserted at least partially into the recess 23 and a protrusion 98 that can be inserted at least partially into the recess 24. One or more rechargeable battery cells 96 are accommodated in the housing 95. Several capacitors 94 for covering short-term power peaks and several electric contacts 97, e.g., contact bushings, are arranged on a circuit board 93 in the protrusion 98. Lines connect the circuit board 93 to the battery cells 96.

One aspect of the present invention relates to contactless or proximity-type recognition of different batteries or accumulators, in particular by means of magnetic sensors (see below). It may be necessary to provide the batteries with one or more magnetic elements, as illustrated in FIG. 5 as an example. Magnetic element 90 is accommodated in a protrusion 98 in a borehole 92. To ensure the clearest possible detection of one or more magnetic parameters, e.g., the magnetic field strength or polarity, the magnetic element 90 is mounted as close as possible to the surface of the battery 100 and/or the magnetic element 90 protrudes at least partially into the housing wall of the housing 95 so that the housing wall has a smaller wall thickness 95A in this area than in other sections of the housing. Alternatively, the magnetic element 90 may also penetrate through the housing wall, in which case it is then preferably contained in its own chamber which is not connected to the interior of the battery so that no soiling can penetrate into the battery. The magnetic element 90 may be designed as a magnetizable coil or as a permanent magnet.

The contact devices 2, 2' also include two electric contact elements 26, 27, e.g., in the form of contact pins which are or can be connected to an electric power source 4 via a first connecting device 3. The battery cells 96 of the battery 100 are recharged in a known way via these two contact elements 26, 27 which are accommodated in the contact bushings 97 when the battery 100 is connected to the charger 1.

A third electric contact element 28, likewise designed as a contact pin, for example, serves to monitor the temperature of the battery 100 during the charging operation. To do so, a temperature sensor is preferably arranged in the interior of the battery 100. In connection of the battery 100 to the charger 1, the temperature sensor is connected via contact 28 to a temperature analyzer circuit in the interior of the charger 1. The temperature analyzer circuit analyzes the signals received from the temperature sensor and responds when a first temperature threshold value is exceeded or when the temperature falls below a second temperature threshold value; for example, it may respond by delivering an acoustic or visual warning or by interrupting the charging operation. In this way, the charging of the battery 100 outside of the desired temperature range is prevented and thus any damage to the battery 100 is prevented. The temperature sensor is preferably designed as a resistor in the battery 100 whose first end is connected to the contact 28 and whose second end is connected to ground.

The contact elements 26, 27 are connected to a charging circuit arranged in the interior of the charger 1. The charging circuit processes in a known way the electric current flowing from the electric power source 4 to the contacts 26, 27 via a first connecting device 3 in such a way that it is suitable for charging the batteries 100, e.g., by rectifying the charging current, transforming it to the voltage required by the battery 100 or adjusting the required amperage.

The charger 1 preferably has a display 29 on its front side to inform the user about different operating states, operating parameters or other relevant data. The display 29 is designed as a luminous display in FIGS. 1 and 4 comprising multiple illumination means, preferably light-emitting diodes (LEDs). Of course, other known display devices, e.g., LCD displays, may also be used. If the user should have the option of selecting parameters or programs, then a so-called touchscreen may also be used as the display. Alternatively or in addition, a keypad may also be used for input or selection of parameters.

The display 29 also comprises multiple display areas: a first display area 30 having three LEDs shows whether the charger 1 is ready for operation. A second area 31, 31' is assigned to the respective contact devices 2, 2' and preferably includes an error display 32, 32' which displays breaking of the contact devices 2, 2', or the connection of a dead battery and which has a charge level display 33, 33' to represent the progress of the charging operation. Display 29 is connected in a known way to circuits in the interior of the charger which receive and process measured values and sensor signals from sensors, detectors and/or measurement circuits and activate and/or deactivate the corresponding LEDs of the display areas 30-33, 33'.

Figure 2:
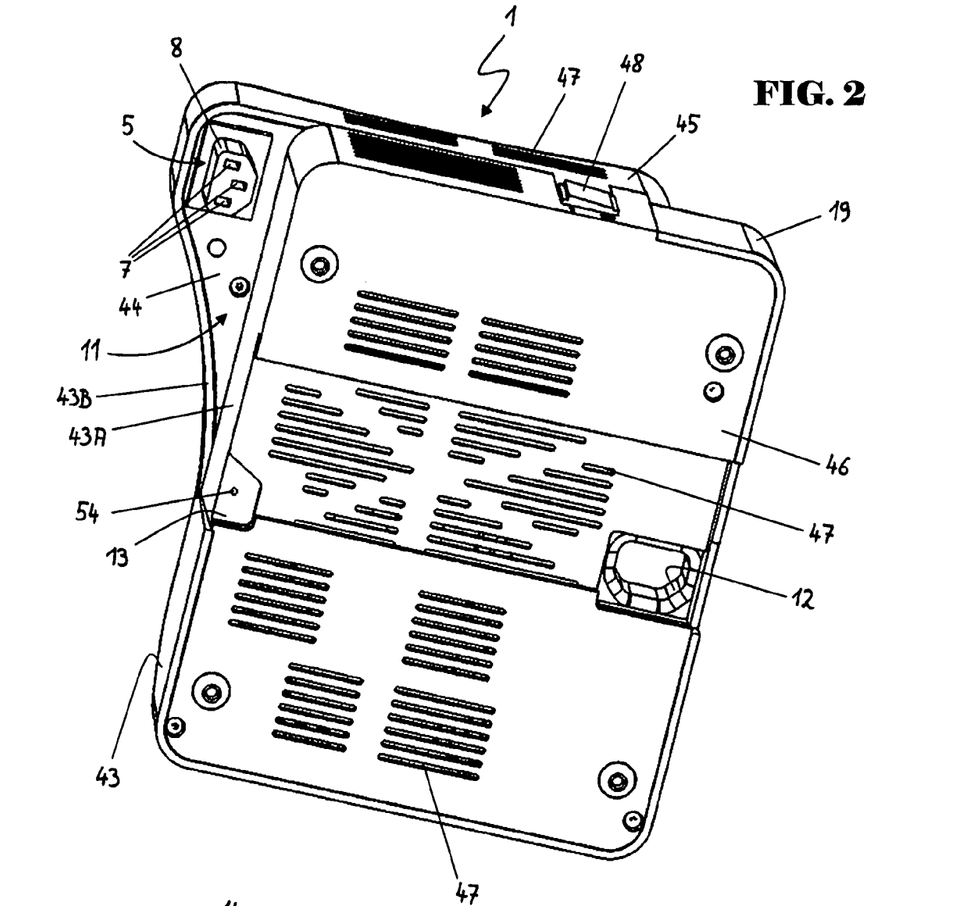
FIG. 2 shows the bottom side of an exemplary embodiment of a device for charging batteries.

As shown in FIGS. 1 and 2, the charger 1 has a first connecting device 3 and a second connecting device 5. The connecting device 3 of the charger 1 serves to connect the charger 1 and all the electrical components contained therein, in particular the contact devices 2, 2', to an electric power source 4 and is arranged in an opening in the housing 19. The second connecting device 5 is electrically connected to the first connecting device 3 and is also accommodated in an opening in the housing 19. The second connecting device 5 is designed so that it can be connected electrically to a second device for charging batteries 1' (see FIG. 6) so that the second device for charging batteries 1' can be connected electrically via the second connecting device 5 to the electric power source 4.

The first connecting device 3 comprises multiple pin-shaped electric contacts 6, while the second connecting device 5 comprises multiple bushing-type contacts 7. However, both connecting devices 3, 5 may of course also comprise other known forms of contacts, e.g., pin contacts or bushing contacts, spring contacts or plate contacts. If alternating current is used as the electric power source 4, then the two connecting devices 3, 5 have three contacts designed as L, N and PE contacts.

Figure 6:
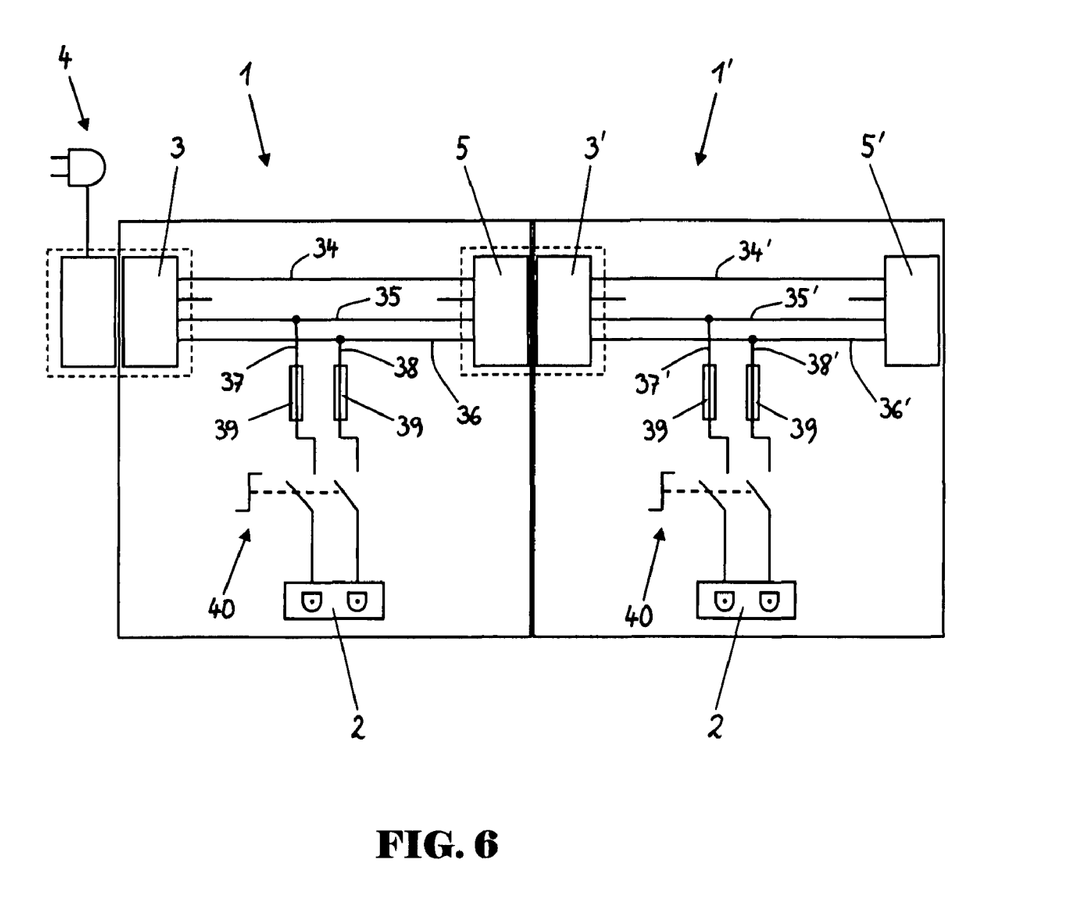
FIG. 6 shows an exemplary embodiment of two circuit arrangements interconnected for two devices for charging batteries, shown in the form of a schematic diagram.

FIG. 6 shows schematically the connection of two devices for charging batteries 1, 1'. The charger 1' corresponds in design and function to the charger 1 shown in FIGS. 1 and 2; preferably at least the design of charger 1' is identical to that of charger 1. For reasons of better comprehensibility, only one contact device 2 has been shown for each of the two chargers 1, 1'. Charger 1 is detachably connected to an electric current source 4, here in the form of the general electric power supply network, via the first connecting device 3. The first connecting device 3, 3' of each charger 1, 1' is designed so that it can be connected optionally to the electric power source 4 or to another charger. Three lines 34, 35, 36, designed as L, N and PE lines, connect the first connecting device 3 to the second connecting device 5. The second connecting device 5 is detachably connected to the first connecting device 3' of the charger 1', so that the electric power supply of the second charger 1' is provided via the connecting devices 3, 5 and the lines 34-36. Between the switch 40 and the contact device 2 there is a charging circuit (not shown) which may include a switched-mode power supply or a transformer.

The charger 1' also has three lines 34', 35', 36' and a second connecting device 5' so that another charger can be connected to this charger 1'. In this way, a chain of chargers of any desired length may be linked together, with the power supply for each charger being provided via the previous chargers, i.e., the chargers arranged between the electric power source 4 and the charger. The same voltage supply is thus provided to each charger.

As also shown in FIG. 6, two other lines 37, 37', 38, 38' branch off from the lines 35, 35', 36, 36', which serve as L and N lines, these additional lines connecting the contact device 2 and optionally other contact devices to the first connecting device 3, 3' and to the electric power source 4. Electric fuses 39 for limiting the current and a switch 40 for opening/closing the connection of the contact device 2 to the connecting device 3 are preferably provided on the lines 37, 37', 38, 38'.

The connecting devices 3, 3', 5, 5' are preferably designed so that a mechanical connection, in particular a form-fitting or force-actuated connection, especially preferably a plug connection, can be established between the first and second device for charging batteries 1, 1' by joining the connecting devices 3, 3', 5, 5', so an additional force must be applied to separate the two chargers 1, 1'. Thus the connecting devices 3, 3', 5, 5' additionally serve as mechanical connecting elements. An improved hold between the chargers 1, 1' is thus achieved in an advantageous manner, and several interconnected chargers may be handled as one unit. In particular, it is thereby also possible to create a connection between the chargers 1, 1' in which no cables or lines running outside of the chargers 1, 1' are needed. As shown in FIGS. 1 and 2, one of the two connecting devices 3, 5, preferably the second connecting device 5, is designed as a protrusion, a plug or a plug member 8 and the other of the two connecting devices 3, 5, preferably the first connecting device 3, is designed as an undercut, a bushing or a hollow plug receptacle 9 to receive the protrusion 8. Protrusion 8 and undercut 9 may have specific shapes to increase the mechanical hold, e.g., they may be designed as polygons. Plug member 8 and plug receptacle 9 may be designed as independent parts made at least partly of plastic, inserted into openings in the housing 19 and secured there.

Charger 1, in particular the housing 19, preferably has a protrusion 11 and a recess 10, whereby one of the two connecting devices 3, 5, preferably the second connecting device 5, is arranged on the protrusion 11, and the other of the two connecting devices 3, 5, preferably the first connecting device 3, is arranged on the recess 10. Recess 10 and protrusion 11 may have the same or different shapes, a variety of shapes, e.g., curved, angular or bent shapes, and may be provided in different areas of the housing 19, e.g., on one of the side walls 42, 43 or on the top side and bottom side 46 of the charger 1, 1'. Regardless of the possible exemplary embodiments, it is important primarily for this preferred exemplary embodiment that the protrusion 11 and the recess 10 are arranged or designed so as to allow the most space-saving possible arrangement or stacking of the interconnected chargers 1, 1'. A space-saving arrangement is understood to refer in particular to an arrangement in which the chargers 1, 1' are only a slight distance apart from one another, or parts of the housing 19 of two chargers 1, 1' are in contact with one another and/or no additional cables or lines running outside of the chargers 1, 1' are necessary for connecting the chargers 1, 1'. This space-saving arrangement of the chargers 1, 1' includes being arranged side-by-side or in series as well as one above the other.

In the exemplary embodiment of the charger according to FIGS. 1 and 2, the first connecting device 3 is arranged in a recess 10, which is formed by a step 41 in a side wall 42 of the housing 19. The side wall 42 thus has an essentially straight lower wall section 42A over a portion of its length in the area of the step 41 and has a curved upper wall section 42B facing away from the lower wall section 42A. The second connecting device 5 is arranged on a protrusion 11 on the side wall 43 of the charger 1 opposite the side wall 42. Protrusion 11 is also formed by a step 44, so that side wall 43 has an essentially straight lower wall section 43A and a curved upper wall section 43B pointing away from the lower wall section 43A. The protrusion 11 and recess 10 thus have essentially complementary shapes, so they engage one inside the other in a compact and fluid manner when two chargers 1, 1' are joined together.

A plurality of vent slots 47 is provided on the rear wall 45 and the underside 46 of the charger 1. An operating element 48 on the rear wall 45 serves to turn the charger 1 on or off and is connected to switch 40. In addition, a first contact device 12 and a second contact device 13 are also provided on the underside 46 of the charger. The contact devices 12, 13 are used for mechanical connection of the chargers 1, 1' and may be designed as plug and/or screw connectors.

Figure 3:
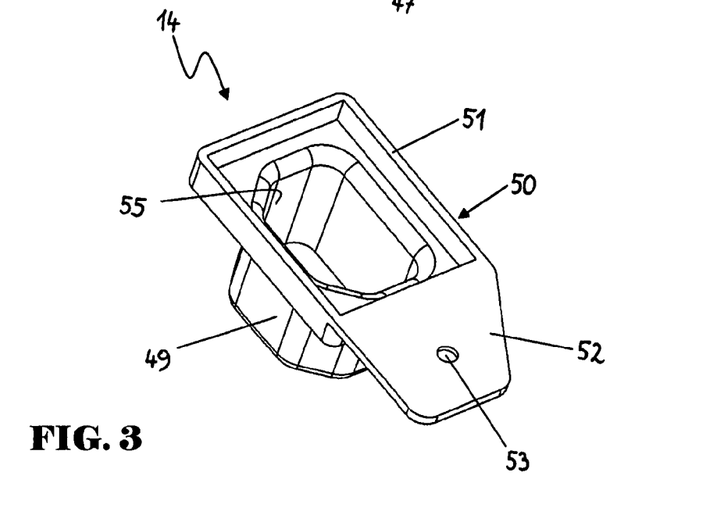
FIG. 3 shows an exemplary embodiment of a combined cover device and connecting device for a device for charging batteries.

A separate mechanical connecting element which can be accommodated in the contact devices 12, 13 or can be connected or attached thereto is used for connecting the chargers 1, 1'. A preferred exemplary embodiment of such a connecting element is illustrated in FIG. 3 where it is labeled with reference numeral 14. Connecting element 14 consists of a body 49 which may be designed to be elongated, round, rectangular or polygonal, for example, and serves as a plug element, which can be inserted into the contact device 12, which is designed as a hollow plug receptacle, and has essentially the same shape as the body 49. A base 50 which is formed by a frame 51 and an extension 52 having a borehole 53 is connected to the body 49. The extension 52 is shaped in such a way that it can be inserted into the contact device 13 and can be attached to the charger, e.g., by a screw which passes through the borehole 53 and can be screwed into another borehole 54 having an inside thread in the charger 1.

A connecting element 14 which can be inserted into the contact device 12 is assigned to each charger 1, whereby the contact device 12 is arranged at the bottom side 46 of the charger 1 in such a way that at least a portion of the extension 52 having the borehole 53 extends beyond the side wall 42, 43 of the charger 1. If this charger 1 is then connected to another charger 1', the extension 52 can be screwed to the contact device 13 of the charger 1'. If the connecting devices 3, 3', 5, 5' are also designed as mechanical connecting elements, then it is important to be sure that the distances between the first connecting device 3, 3' and the first contact device 12 and between the second connecting device 5, 5' and the second contact device 13 are the same.

Preferably the body 49 of the connecting element 14 is formed as a hollow body having a cavity 55. Cavity 55 has essentially the same shape as the plug member 8 of the second connecting device 5, and the inside dimensions of the cavity 55 correspond approximately to the outside dimensions of the plug member 8. The connecting element 14 may thus be placed on the plug member 8 and screwed onto step 44 through borehole 53 and another borehole having an inside thread in step 44. Connecting element 14 thus additionally functions as a protective cap for the plug member 8 as long as no plug receptacle 9 of first connecting device 3' of another charger 1' has been connected to this plug member 8. If an additional charger 1' is connected, the connecting element 14 must be removed from the plug member 8 and can be used immediately for mechanical connection of the two chargers 1, 1'.

Figure 4:
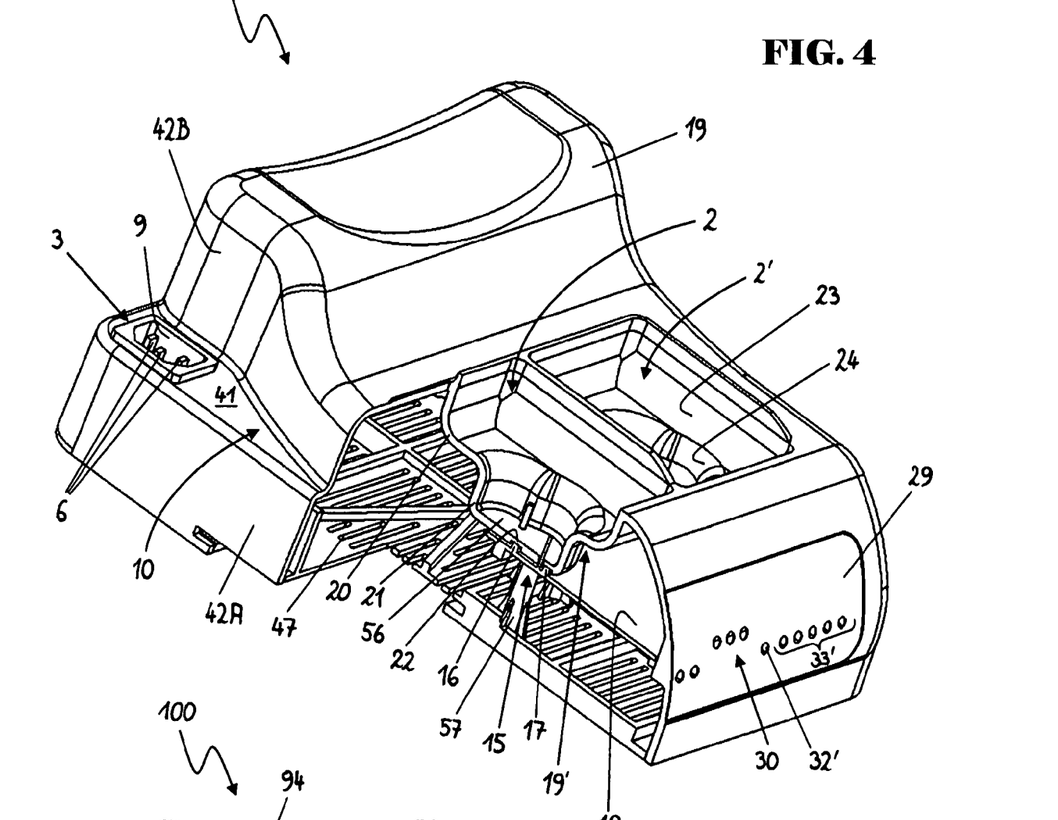
FIG. 4 shows a partial sectional diagram through the device for charging batteries according to FIG. 1.

FIG. 4 shows in a partial sectional diagram a section through the contact device 2 and areas of the charger 1 below that. The contact devices 2, 2' are designed so that they are or can be connected to an electric power source 4 and batteries 100 having different charging requirements can be connected thereto. Batteries having different charging requirements may require, for example, different charging methods or different types of charging currents, in particular different voltages and/or amperages. As described further above, they may also be shaped differently.

Contact device 2 has a housing section 19' which is part of the housing 19 of the charger 1. A portion of the housing 19' forms the bottom 56 of the contact device 2 and the receptacle 24. Beneath the bottom 56 in the interior of the charger 1 there is at least one magnetic sensor 16, 17. The magnetic sensor(s) 16, 17 is/are part of a contactless or proximity-type identification device 15 for recognition of batteries having different charging requirements.

The magnetic sensor(s) 16, 17, which may be designed as Hall sensors or as reed contacts, for example, determine, on recognition of the battery, one or more magnetic parameters of one or more magnetic elements that are connected to the battery. FIG. 5 shows as an example such a battery 100 having a magnetic element 90. The magnetic parameters detected may preferably be the magnetic polarity, the magnetic field strength or the magnetic field direction. Accordingly, sensors, which detect the presence of a magnetic field or the magnetic polarity or the magnetic field strength or the magnetic field direction, are used as magnetic sensors 16, 17.

To achieve the most reliable possible detection of the magnetic parameters, the distance between the at least one magnetic element 90 and the at least one magnetic sensor 16, 17 should be as small as possible during the identification process. Therefore, the at least one magnetic sensor 16, 17 is preferably arranged as close as possible to the bottom 56 of the contact device 2. The housing 19' of the contact device 2 especially preferably has a housing wall 20 with at least one area of a first wall thickness 21 and with an area having a second smaller wall thickness 22, whereby the at least one magnetic sensor 16, 17 is arranged essentially in the area of the second smaller wall thickness 22.

The design of the contact device 2' and optionally other contact devices of the charger 1 as well as the arrangement of the at least one magnetic sensor 16, 17 are identical to those of the contact device 2 described above.

In the interior of the charger 1, a charging circuit, which is connected to the identification device 15, is also provided. The at least one magnetic sensor 16, 17 can thus relay an identification signal to the charging circuit when it detects a magnetic parameter, said signal being processed by the charging circuit and used to detect the different types of batteries that can be connected. If the charging circuit has recognized the battery connected to the contact device 2, 2', it determines the charging requirement(s) necessary for this battery. It then charges the battery in accordance with these charging requirements, e.g., with the charging method suitable for this battery or with the proper charging current. The charging requirements for the different types of batteries may be stored in a memory, which is located in or connected to the charger 1. Alternatively, the identification device 15 switches the parameters of the charging circuit directly, so that advantageously no microcontroller and no memory are needed.

One magnetic sensor 16, 17 or more magnetic sensors 16, 17 of the same or different types may be arranged essentially in the area of each electric contact device 2, 2'. If there is only one magnetic sensor 16, 17 which delivers an identification signal in the presence of a magnetic field, then two types of batteries can be differentiated with it, one of the two batteries being provided with a magnetic element and the other battery not carrying any magnetic element. If the charging circuit receives an identification signal, e.g., if the magnetic field is detected, it charges the battery according to first charging requirements, or if it does not receive an identification signal, then it charges the battery according to the second charging requirements. However, if several such magnetic sensors 16, 17 are provided per contact device 2, 2', then several types of batteries can be differentiated in that the batteries have no, one or more magnetic elements which are connected to the battery at different locations. The recognition of the respective battery is thus performed based not only on detection of the presence and/or absence of a magnetic field but instead is also based on where the magnetic field is detected.

If a sensor that is designed for delivering an identification signal as a function of the magnetic polarity detected is used as the magnetic sensor 16, 17, then it is also possible to differentiate two batteries, one of the two batteries containing a magnetic element whose south pole is directed toward the magnetic sensor 16, 17 when the battery is connected to the contact device 2, 2' and the second battery contains a magnetic element whose north pole is directed toward the magnetic sensor 16, 17 when the battery is connected to the contact device 2, 2'. If the charger has multiple sensors, then again several types of batteries can be recognized, each sensor delivering an identification signal if the polarity of the magnetic element assigned to it is recognizable by it.

A magnetic sensor 16, 17 that is designed for delivering an identification signal as a function of the detected magnetic field strength may be used as an alternative type of sensor. The advantage of such a sensor is that it can detect different magnetic field strengths, so that only one sensor is needed for differentiating multiple batteries and each battery needs only one magnetic element, wherein each magnetic element has a different field strength. It is of course also possible here to provide each contact device 2, 2' with multiple field strength sensors and to provide each battery with multiple magnetic elements.

In addition, the magnetic sensor 16, 17 may be designed for emitting an identification signal as a function of the field direction detected. This type of sensor detects different alignments of field directions, so that here again, only one sensor is needed to differentiate multiple batteries. Again, to recognize the batteries, one magnetic element that is set up differently for each battery is sufficient, so that its field direction is different for each battery. However, it is of course also possible here to provide each contact device 2, 2' with a plurality of field direction sensors and to provide each battery with a plurality of magnetic elements.

The term magnetic sensor is understood according to this invention to refer to individual sensors, e.g., a Hall sensor or a reed contact as well as several individual sensors combined into one functional unit, so they can detect the magnetic parameters indicated above.

To ensure good signal recognition or magnetic parameter recognition without any mutual unwanted influence, it is advantageous in particular when using two or more magnetic sensors 16, 17 per contact device 2, 2' to make the distance between the magnetic sensor 16, 17 and the respective magnetic element of the batteries smaller than the distance between the two adjacent magnetic elements and/or between two neighboring magnetic sensors 16, 17. A magnetic sensor and its respective magnetic element are understood to refer to a magnetic element, whose magnetic property is detected by this magnetic sensor when a battery is connected to a contact device 2, 2'. The distance between a magnetic sensor and a respective magnetic element should preferably be less than 5.0 mm, especially preferably equal to or less than 3.0 mm. The distance between two magnetic elements and accordingly between two magnetic sensors 16, 17 should preferably be greater than 8.0 mm, especially preferably greater than 16.0 mm.

The magnetic sensors 16, 17 are attached to a carrier device 18, preferably a circuit board, in the interior of the charger 1. The circuit board is carried by carrier elements and supporting elements 57, so it is situated in the immediate vicinity of the bottom 56 of the contact device 2. The charging circuit is preferably also arranged on the carrier device 18. Other circuits of the charger 1, e.g., a temperature analyzer circuit for monitoring the temperature of the battery 100 or the circuits for operating the LEDs of the display 29, or the LEDs of the display 29 are especially preferably also arranged on the carrier device 18.

The present invention is not limited to the exemplary embodiments described here, but instead includes all possible exemplary embodiments which do not change the basic function principle of the invention. It is of course also possible to create a charger that has an identification device to determine a magnetic parameter of a magnet of a battery as well as an identification device to recognize the change in a magnetic parameter of a magnet, which is part of the charging device. The magnetic sensors may also be designed in a known way so that they continuously emit a signal and, when they detect a magnetic parameter, they interrupt the signal emission, so that according to this invention, the term "identification signal" is also understood to refer to the interruption of a continuously pending signal and/or "non-receipt of a signal."

Various embodiments may be configured to operate with batteries that have a magnetic parameter varying device operable to vary a magnetic parameter of a magnetic element, such as one coupled to a battery. In one embodiment, the at least one magnetic parameter varying device comprises paramagnetic or preferably ferromagnetic material. This material concentrates or bundles the magnetic field lines, in particular in its surroundings, thus raising the magnetic field strength in the surroundings. To achieve this effect, preferably the magnetic conductivity of the at least one magnetic parameter varying device is higher then the magnetic conductivity of its surroundings. A magnetic sensor, which is in the vicinity of the magnetic parameter varying device, may detect the rising magnetic field strength and send a signal to identify the battery. The paramagnetic or ferromagnetic material may comprise, for example, platinum, lithium, sodium, potassium and iron, cobalt or nickel.

In one embodiment, the at least one magnetic parameter varying device comprises diamagnetic material. This material diverts the magnetic field lines, in particular in its surroundings, thus reducing the magnetic field strength in the surroundings. A magnetic sensor, which is in the vicinity of the magnetic parameter varying device, may detect the reduced magnetic field strength and send a signal to identify the battery. The diamagnetic material may comprise, for example, bismuth.

In another embodiment, the at least one magnetic parameter varying device is nonmagnetic, in other words it does not have a magnetic source, e.g. a permanent magnet. This embodiment has the advantage that the magnetic parameter varying device does not affect or interfere with elements of the battery or electronic parts of a device that the battery is intended to power, e.g. an electronic motor of a medical handpiece.

According to this invention, various chargers may also be interconnected so that, for example, chargers may be used with a different number of contact devices, with differently shaped contact devices or contact devices of different sizes, chargers which use different charging methods, etc. It is essential that the connecting devices must be designed so that the chargers can be connected to one another so that the power supply of a charger is provided via the charger arranged in front of it and thus through a common power source upstream therefrom.

What is claimed is:

1. A device for charging batteries of medical instruments comprising:
at least one electric contact device for connecting a battery, the at least one contact device being connectable through a charging circuit to an electric power source, and whereby batteries having different charge requirements can be connected to the at least one contact device;
an identification device for recognizing the different batteries and coupled to the charging circuit for charging the batteries according to their respective charging requirements, wherein the identification device comprises at least one magnetic sensor for detection of at least one magnetic parameter of a magnetic element connected to the connectable batteries, the at least one magnetic sensor being coupled to the charging circuit for relaying an identification signal, and wherein the charging circuit is operable to recognize a connected battery based on the identification signal and to select a charging requirement assigned to the connected battery from among the charging requirements; and
a first connecting device for supplying electrical power to the contact device through the charging circuit and a second connecting device electrically connected to the first connecting device and configured for electrically connecting and supplying electrical power to a second device for charging batteries so that the second device for charging batteries can receive electric power via the second connecting device.

2. A device for charging batteries comprising:
at least one electric contact device for connecting a battery, the at least one contact device being connectable through a charging circuit to an electric power source, and whereby batteries having different charging requirements can be connected to the at least one contact device; and
an identification device for recognizing the different batteries and coupled to the charging circuit for charging the batteries according to their respective charging requirements, wherein the identification device is a contactless identification device without a direct electric contact between the battery and the identification device and the identification device comprises at least one magnetic element and at least one magnetic sensor for detection of at least one magnetic parameter of the at least one magnetic element, wherein the at least one magnetic sensor for relaying an identification signal is coupled to the charging circuit, wherein the at least one magnetic element and the at least one magnetic sensor are configured so that variation in at least one magnetic parameter of the magnetic element by a magnetic parameter varying device connected to a connectable battery is detectable by the at least one magnetic sensor, and wherein the charging circuit is operable to recognize a connected battery based on the identification signal and to select a charging requirement assigned to the connected battery from among the charging requirements.

3. The device for charging batteries according to claim 1, wherein the at least one magnetic sensor is operable to at least one of emit an identification signal in the presence of a magnetic field, emit an identification signal as a function of the magnetic polarity detected, emit an identification signal as a function of the detected magnetic field strength, and emit an identification signal as a function of the field direction detected.

4. The device for charging batteries according to claim 2, wherein the at least one magnetic sensor is operable to at least one of emit an identification signal in the presence of a magnetic field, emit an identification signal as a function of the magnetic polarity detected, emit an identification signal as a function of the detected magnetic field strength, and emit an identification signal as a function of the field direction detected.

5. The device for charging batteries according to claim 1, wherein the at least one magnetic sensor is a first magnetic sensor, further comprising at least a second magnetic sensor, wherein the first and second magnetic sensors are of one or different types, and wherein the magnetic sensors are arranged at different locations in the area of the contact device.

6. The device for charging batteries according to claim 2, wherein the at least one magnetic sensor is a first magnetic sensor, further comprising at least a second magnetic sensor, wherein the first and second magnetic sensors are of one or different types, and wherein the magnetic sensors are arranged at different locations in the area of the contact device.

7. The device for charging batteries according to claim 1, wherein the at least one magnetic sensor and the charging circuit are arranged on a common carrier device.

8. The device for charging batteries according to claim 2, wherein the at least one magnetic sensor and the charging circuit are arranged on a common carrier device.

9. The device for charging batteries according to claim 7, wherein the common carrier device comprises a circuit board.

10. The device for charging batteries according to claim 8, wherein the common carrier device comprises a circuit board.

11. A device for charging batteries of medical instruments comprising:
   at least one electric contact device for connecting a battery, the at least one contact device being connectable through a charging circuit to an electric power source, and whereby batteries having different charge requirements can be connected to the at least one contact device;
   an identification device for recognizing the different batteries and coupled to the charging circuit for charging the batteries according to their respective charging requirements, wherein the identification device comprises at least one magnetic sensor for detection of at least one magnetic parameter of a magnetic element connected to the connectable batteries, the at least one magnetic sensor being coupled to the charging circuit for relaying an identification signal, and wherein the charging circuit is operable to recognize a connected battery based on the identification signal and to select a charging requirement assigned to the connected battery from among the charging requirements; and
   wherein the contact device comprises a housing having a housing wall, wherein the housing wall has at least one area of a first wall thickness and an area of a second smaller wall thickness, and wherein the at least one magnetic sensor is arranged in the area of the second smaller wall thickness.

12. The device for charging batteries according to claim 2, comprising a first connecting device electrically connected to the contact device through the charging circuit, further comprising a second connecting device electrically connected to the first connecting device and configured for electrically connecting and supplying electrical power to a second device for charging batteries so that the second device for charging batteries can receive electric power via the second connecting device.

13. A battery comprising at least one repeatedly electrically rechargeable battery cell and having electric contacts connected to the at least one battery cell and connectable to a device for charging batteries, the battery further comprising at least one shielding and/or amplifying device formed of a magnetically conductive material through which a magnetic parameter of a magnetic element of an identification device of a device for charging batteries is variable so that a charging circuit of the device for charging batteries can determine the charging requirement of the battery so the battery can be charged according to the charging requirement.

14. The battery according to claim 13, wherein the at least one shielding and/or amplifying device comprises an element of soft iron.

15. The battery according to claim 13, wherein the at least one shielding and/or amplifying device comprises paramagnetic or preferably ferromagnetic material.

16. The battery according to claim 13, wherein the at least one shielding and/or amplifying device comprises diamagnetic material.

17. The battery according to claim 13, wherein the at least one shielding and/or amplifying device is nonmagnetic.

18. The battery according to claim 13, wherein the at least one shielding and/or amplifying device is configured to concentrate magnetic field lines in its surroundings.

19. The battery according to claim 13, wherein the at least one shielding and/or amplifying device is configured to reduce or divert magnetic field lines in its surroundings.

20. The battery according to claim 13, wherein the magnetic conductivity of the at least one shielding and/or amplifying device is higher than the magnetic conductivity of its surroundings.

21. A set of multiple batteries, wherein each battery comprises at least one repeatedly electrically rechargeable battery cell, electric contacts connected to the at least one battery cell, and at least one magnetic element, and wherein each battery is connectable to a device for charging batteries, wherein the magnetic elements of the set of batteries have different magnetic field strengths, so that each battery of the set of batteries is distinguishable by a magnetic sensor from each other battery due to the battery's respective magnetic field strength.

22. A set of multiple batteries, wherein each battery comprises at least one repeatedly electrically rechargeable battery cell, electric contacts connected to the at least one battery cell, and at least one magnetic element, and wherein each battery is connectable to a device for charging batteries, wherein the magnetic elements on the batteries are disposed such that their magnetic field directions are oriented differently from each other so that each battery of the set is distinguishable by a magnetic sensor from each other battery due to the orientation of the magnetic field direction for the respective battery.

* * * * *